United States Patent [19]

Osgood

[11] 4,102,831
[45] Jul. 25, 1978

[54] IMPARTING ANISOTROPY TO FOAMS BY ORIENTING ADDED FIBERS WHEREBY SAID FIBERS BECOME PARALLELY ALIGNED

[76] Inventor: Alan A. Osgood, 32 Woodhill Dr., Newark, Del. 19711

[21] Appl. No.: 731,742

[22] Filed: Oct. 12, 1976

[51] Int. Cl.² ............................................. C08G 18/14
[52] U.S. Cl. ..................................... 521/99; 521/123; 521/122; 521/109; 521/137
[58] Field of Search ............ 260/2.5 AK, 2.5 BD, 260/2.5 L, 2.5 S, 2.5 H, 2.5 F, 2.5 EP, 2.5 N, 2.5 HA, 2.5 HB

[56] References Cited

U.S. PATENT DOCUMENTS

| | | | |
|---|---|---|---|
| 2,842,799 | 7/1958 | Politzer | 264/49 |
| 2,902,720 | 9/1959 | Lachiche | 264/108 |
| 2,915,475 | 12/1959 | Bugosh | 260/2.5 AK |
| 3,359,350 | 12/1967 | Godfrey | 264/108 |
| 3,574,684 | 4/1971 | Higashi | 260/2.5 AK |
| 3,900,648 | 8/1975 | Smith | 260/2.5 AK |

Primary Examiner—M. J. Welsh
Attorney, Agent, or Firm—C. Walter Mortenson

[57] ABSTRACT

This invention relates to a method of imparting anisotropy to polymeric foams and to the resultant products. By this invention enhanced mechanical properties are produced in polymeric foams such properties being, for example, compressive yield strengths, modular tensile strengths, and the like. Importantly, other properties of enhanced value are achieved, as for example, improved thermal conductivity and enhanced burning rates.

The process involved comprises mixing in liquid form various components of the foam which is to be produced in a foaming step which involves the action of the components in the presence of a foaming agent that effects the foam expansion, and mixed with these liquid mixtures is a low level concentration of relatively short fibers, one-half inch or less, the fibers being made from either an inorganic or organic material with fiber glass or aluminum fibers being preferred. The amount of such fibers is 10% or less based on the final weight of the foam, this being in reference to a foam having a density of 2 pounds per cubic foot. Foams of greater or of less density are appropriately loaded with the fibers as will appear hereinafter.

An important part of this invention is the production of foams in which the added fibers are lined up in a parallel arrangement, the parallelism being to the direction of the foam expansion. As a result of the parallel alignment, a structural reinforcement occurs, there being an increase in the compressive strength. Other improved physical properties are obtained as described hereinafter.

10 Claims, 6 Drawing Figures

IMPARTING ANISOTROPY TO FOAMS BY ORIENTING ADDED FIBERS WHEREBY SAID FIBERS BECOME PARALLELY ALIGNED

STATUS OF THE PRIOR ART

The placement of fillers of various kinds into polymeric substances is an extensive art. Such materials as pigments, fibers, graphite, mica, among many others, have been used to alter the properties of polymeric materials. Properties such as electrical conductivity, impact strength, brittleness, and the like can be introduced into or enhanced in many polymeric substances by the use of such fillers. Among the many references dealing with such art are the following U.S. Pat. Nos. 2,569,157; 2,822,627; 2,842,799; 2,899,704; 2,902,720; 2,989,775; 3,328,500; 3,328,501; 3,312,763; 3,359,350; 3,378,613; and 3,442,997.

However, hithertofore, foams have not been modified by selecting conditions in a manner to introduce into the final foamed material fibers that are in parallel alignment without external conditions or elements, such as the use of directional vanes, screens, nozzles, etc. (U.S. Pat. Nos. 2,902,720; 3,359,350; 2,842,799)

Such an alignment is highly desirable because of the several-fold increase in compressive strength that can be obtained with minimal cost.

Accordingly, an objective of this invention is to produce fiber-loaded foamed materials. A further objective is to produce such materials in which the fibers are parallelly oriented in the direction of the foam expansion.

A still further aim is the production of shaped articles having increased strength whether the articles be made from rigid or semi-rigid or non-rigid fiber-loaded foams. These and other objectives will appear here and hereinafter.

BRIEF DESCRIPTION OF THIS INVENTION

By this invention, relatively short fibers, less than 0.5 inch in length are incorporated at low levels of concentration, less than 10% in a 2 pound density foam, in a manner whereby the liquid foaming materials react in the presence of the fibers which due to the faming action are alighed parallelly, but randomly so, in the direction of the foaming. Thus, a method of obtaining anisotropy is provided. The compressive yield strength and the modulus of the products among other physical characteristics are greatly improved. Of the short fibers which may be used, aluminum or glass fibers are preferred, but stiff mono-or polyfilament plastic fibers may be used as well.

This invention will be further understood by reference to the drawings and to the examples given below which parts and percentages are by weight unless otherwise specified. These examples are given for illustrative purposes only. In the drawings.

Figure 5:
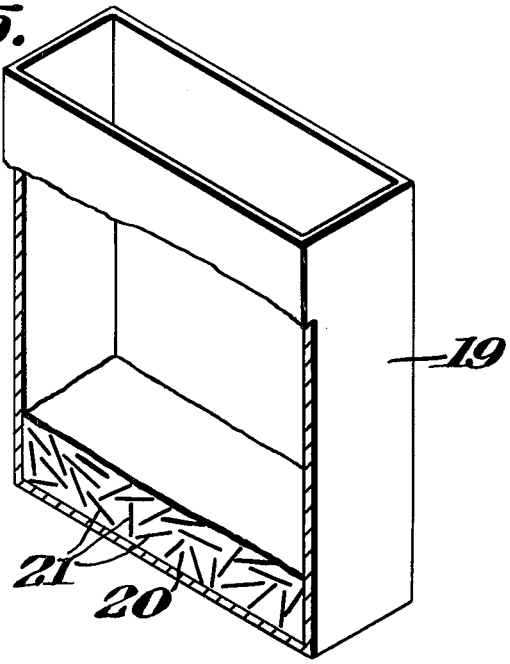

FIG. 5 similarly depicts a wide vertical container; and

Figure 6:
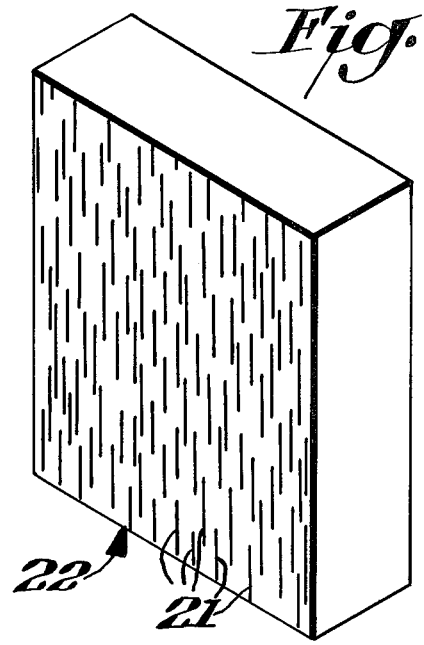

FIG. 6 shows in cross-section the foamed, uncontained product resulting from the foaming of the mix in FIG. 5.

EXAMPLE I

A standard polyurethane foam having a density of 2 pounds per cubic foot and containing no additives is prepared in a conventional material using the following ingredients and procedures such as disclosed in any of the following U.S. Pat. Nos. 2,779,689; 2,962,183; 3,084,177; 3,102,875; 3,194,773; and 3,846,347, among others. These patents include the production of flexible semi-rigid and rigid foams, and while this invention is concerned mainly with rigid foams, the listed patents afford to anyone skilled in the art ingredients and processes for making polyurethanes and foams therefrom for the purposes of this invention. Thus, for example, pentaerythritol propoxylated with propylene oxide to form a product having a hydroxyl number of 320 is readily reacted with 2,4-toluene diisocyanate in the presence of monofluorotrichloromethane, a catalyst, such as triethylenediamine, and a silicone emulsifying agent to produce a rigid foam, the reaction mixture being initially liquid in form and the exothermic heat evolved by the reaction of the tetrol and polyisocyanate effecting the conversion of the halohydrocarbon to a gas thereby causing foaming and the formation of pores or cells in which the halohydrocarbon is trapped.

Such a foam is designated as control foam "A". Then the same method is used to produce a foam within this invention, the weights of the reactants being the same and both being foamed to the same volume; but in this latter instance, the liquid materials that are being mixed are made to contain 5% based on the final weight of the said foam, of aluminum fibers which are about ⅛ inch long. This foam is designated below as anisotropic foam "B".

From the resultant rigid foam in each case samples were cut and tested. The results are given below.

TABLE 1

Compression Test (cubes)

| A. Control Foam | B. Anisotropic Foam |
|---|---|
| 25.5 | 72 |
| 25 | 78 |
| 26 | 72 |
| Ave.=25.5 lb./in.$^2$ | Ave.=74 lb./in.$^2$ |

Tensile Test Joint Army Navy Air Force

| | Stress psi | Strain in./in. | Modulus psi | Modulus Ave. |
|---|---|---|---|---|
| A | 81.9 | 058 | 1500 | |
| | 84.9 | 073 | 1680 | |
| | 59.3 | 050 | 1790 | 1660 psi |
| | | | AVE: 1656 | |
| B | 81 | 085 | 3646 | |
| | 87.2 | 077 | 4970 | |
| | 92.7 | 090 | 2880 | 3830 psi |
| | | | AVE: 3828 | |

From the above it can be seen that by the method of this invention a three-fold increase in compressive strength and a two-fold increase in modulus is obtained.

Similar results are also obtained when other foamable, liquid polymers, suh as silicone polymeric liquids, are treated as above.

EXAMPLE II

The amount of fiber that is to be used with a given system of reactants will depend not only upon the density of the fibers but upon the density of the foam that is to be produced by the given reactants. Thus, high, medium, and low density foams will have different loadings of fibers in order to produce the desired improvements via anisotropy.

For example, if one is going to make a 40 pound per cubic foot density foam using aluminum fibers ⅛ inch in length, he will load it with less fibers than he uses to load a 2 pound per cubic foot density foam with the same fibers to get the approximate same increase in compressive strength. Similarly, if one used a fiber which has a lower specific gravity or density than aluminum, he will need less of those fibers by weight because there would be more individual fibers per unit weight than there would be in the weight of a more dense fiber. Conversely, if the fibers that are being used have a higher density than aluminum fibers, one will have to use a greater weight of those fibers than he uses of aluminum since there would be a small number of fibers per unit weight. The compressive strength increase results from the alignment of the fibers in a parallel arrangement. In other words, the vast majority of the fibers in a cube of polyurethane foam produced by the process of this invention are parallel to the walls of the cube in a vertical plane as the cube rests on the floor immediately after its production with the direction of the foaming being upwardly from the floor.

With reference to Example I it is useful to consider fiber loading near the maximum and minimum levels of usefulness. For example, two formulations can be considered, one having twice the number of fibers and the other one having 1/10th as many fibers as the foam of Example I. These are tabulated below:

TABLE 2A

| Extreme Fiber Loading, Weight Percent | | | | |
|---|---|---|---|---|
| Foam Density lb./ft.$^3$ | Fiber Specific Gravity | Min. Loading Wt. % | Loading of Exp. I Wt. % | Max. Loading Wt. % |
| 2 lbs./ft.$^3$ | 2.7 | 0.50% | 5.0% | 10% |

If this same 2 lbs./ft.$^3$ foam is made at the same range of volumetric loading ranges but using either fibers having a low specific gravity, say 0.9, such as some polyethylene fibers or alternately using fibers of high specific gravity such as steel, 7.8, the weight percent of fibers will then be as shown in Table 2B.

TABLE 2B

| Weight Percent of Polyethylene (Low Density) or Steel (High Density) Fibers | | | | |
|---|---|---|---|---|
| (At the same volumetric loading as foams of Table 2A) | | | | |
| Foam Density lb./ft.$^3$ | Fiber Specific Gravity | Min. Fiber Loading Wt. % | Loading of Exp. I Wt. % | Max. Loading Wt. % |
| 2 lbs./ft.$^3$ | 0.9 | 0.17% | 1.7% | 3.3% |
| 2 lbs./ft.$^3$ | 2.7 | 0.50% | 5.0% | 10.0% |
| 2 lbs./ft.$^3$ | 7.8 | 1.44% | 14.4% | 28.9% |

The fiber loading of Table 2B above, but in a high density foam, say 40 lbs./ft.$^3$ is given in Table 2C below.

TABLE 2C

| Weight Percent of Fibers in High Density Foam | | | | |
|---|---|---|---|---|
| (At same volumetric loading as foams of Table 2) | | | | |
| Foam Density lb./ft.$^3$ | Fiber Specific Gravity | Min. Fiber Loading Wt. % | Loading of Exp. I Wt. % | Max. Loading Wt. % |
| 40 lbs./ft.$^3$ | 0.9 | 0.008% | 0.083% | 0.17% |
| 40 lbs./ft.$^3$ | 2.7 | 0.025% | 0.250% | 0.50% |
| 40 lbs./ft.$^3$ | 7.8 | 0.072% | 0.720% | 1.44% |

The same reasoning can be used to generate a table of fibers loading in an extremely low density foam.

TABLE 2D

| Weight Percent of Fibers in Low Density Foams | | | | |
|---|---|---|---|---|
| (At same volumetric loadings as foams of Table 2B) | | | | |
| Foam Density lb./ft.$^3$ | Fiber Specific Gravity | Min. Fiber Loading Wt. % | Loading of Exp. I Wt. % | Max. Loading Wt. % |
| 1 lb./ft.$^3$ | 0.9 | 0.33% | 3.3% | 6.8% |
| 1 lb./ft$^3$ | 2.7 | 1.00% | 10.0% | 20.0% |
| 1 lb./ft.$^3$ | 7.8 | 2.89% | 28.9% | 57.8% |

While the physical properties enhanced by the anisotropy induced in the foam polymeric materials of this invention are mostly related to strength such as compressive or tensile strength or modulus, other physicals can be improved under controlled conditions. For example, thermal conductivity can be controlled; if it is desired to minimize this property, fibers of low thermal conductivity such as fiber glass can be used; if, on the other hand, it is desired to maximize thermal conductivity as it might be in specialized applications such as in a frangible high burning rate, foam core of a solid propellant rocket engine, fibers with a high thermal conductivity such as aluminum would be selected, and the molding process would be selected so as to cause the fiber alignment to be in the desired configuration, in this case perpendicular to the anticipated flame front. Analogously, electrical conductivity can also be controlled.

While this invention has been illustrated by the above examples in which aluminum fibers are referred to in the main, it is to be understood that other fibers may be used in place of aluminum. They can be synthetic polymeric materials, organic or inorganic, and they can be naturally occurring fibers. The synthetic fibers can be thermosetting or thermoplastic. Fibers of other materials may be used. Included among the useful fibers are fiberglass, potassium titanate, tetrafluoroethylene polymers such as poly (tetrafluoroethylene) and copolymers thereof including fully fluorinated polymeric materials, polyethylene, poly(ethylene terephthalate) or copolymers of the terephthalate, polyamides, polyformaldhydes, steel, graphite, carbon, asbestos, or quartz fibers, those from jute, sisal, hemp, and cotton and cotton derivatives and cellulsic fibers such as rayon and cellulose esters as, for example cellulose acetate. Generally, the fibers are about ⅛ inch long but may be as much as ½ inch long, and they have a cross section of about 0.002 inch to about 0.005 inch. They are generally circular in cross section in optimum condition, although this is not necessary. Any variety of shapes, such as oval, diamond, square, cross or hexagon can be used.

Dimensions of the fibers such as their length and diameter, as well as the amount, are an important factor in this invention. While fibers that are ⅜ of an inch to about 0.5 inch in length can be used, it has been found that they are very difficult to disperse properly. If the particular fiber is a rigid one, such as glass fibers or an aluminum fiber, then the higher limit of those lengths can be tolerated, but it is still preferred to use fibers less than ⅜ of an inch long and preferable ⅛ inch long. Since the objective of this invention is to gain anisotropy by the orientation of the fiber that is being used, the fiber should be such that it is not too long to cause bunching up or formation of small clumps of interlocked fibers. With each fiber, depending upon its density and the density of the foam that is to result, there will be a certain concentration of fibers that would be optimum.

Such optimum can, of course, be readily determined by one skilled in the art. For example, when aluminum or glass fibers are being used, a concentration of about 5% by weight is preferred as is the case with asbestos and quartz fibers. However, when steel fibers are being employed, the concentration of about 14.4% is found to be best. With graphite, the percentage is about 4.2 while with polyethylene the percentage is about 1.8.

In connection with the fiber dimensions, useful expressions are the ratio of the length to the diameter, L/D, or the term "Aspect Ratio" as used in aerospace technology. With non-circular fibers, the D becomes more or less estimated as the square root of the cross-sectional area. in Example I above the L/D ratio was 66/1. There were 164 fibers/sq. in. or 12.8/inch there being about 0.08 inch between fibers. The lower limit on the L/D ratio is about 4/1. It depends, to some extent on the density or stiffness of the fiber but fibers that lack inherent rigidity can be coated or primed with a variety of materials. Preferred among these are the epoxy resins. For example, an aluminum sheet of desired thickness is coated with an epoxy resin on both sides, and the resultant sheet, after curing of the resin is complete, is slit or chopped into fiber lengths as used in Example I. In a direct comparison of unprimed with primed, the unprimed fibers led to an increase in compressive strength of 2.5/1 whereas the primed fibers brought about an increase of 2.9/1.

The materials used to produce polyurethane foams may be such as to produce polyester or polyether foams and either the prepolymer technique or the "one-shot" process can be employed. Either open or closed celled foams can be produced. The only requirement is that the starting materials be in liquid form and that they expand during the foaming process so that the fibers will be allowed to orient themselves in the direction of the foam expansion without interference.

Included among the many materials which can be used to make polyurethanes are the following polyisocyanates: 4, 4' - diisocyanatodiphenyl methane, hexamethylene diisocyanate, ethylene diisocyanate, m-phenylene diisocyanate, 2, 4 - toluene diisocyanate, 2, 6 - toluene diisocyanate, cyclohexylene - 1, 2 - diisocyanate, 3, 3' - dimethyl - 4, 4' - biphenylene diisocyanate, triphenylmethane triisocyanate, tetramethylene, thiodipropyl diisocyanate, 1, 5 - naphthalene diisocyanate, among others, as well as mixtures of such and unsaturated polyurethanes made from polyisocyanate/vinyl monomers such as hydroxyethyl acrylate or hydroxypropyl acrylate, as disclosed in U.S. Pat. No. 3,772,404. Other polyurethanes that can be used include those in such U.S. patents as U.S. Pat. Nos. 3,073,788; 3,084,177; 3,102,875; 3,194,773, 3,549,569; and 3,846,347, among others. Such patents clearly show the active hydrogen materials that can be employed to make polyurethanes and the techniques involved in foaming.

It is well known, of course, that a number of polymeric materials, natural and synthetic, are foamable, such as natural rubber, the several synthetic rubbers, the polystyrenes and the polysilicones, for example. The principles of this invention are applicable to such foamable substances, the anisotropy of the resultant foams being improved by the alignment of the fibers as explained above. Of the various polymeric materials used, the polyurethanes are preferred.

The liquid, foamable material can be mixed with the fibers in any convenient way using conventional stirrers, vibrators, mixing heads and the like. The fibeers may be added to one or both of liquid components that are to be added together to produce a new polymer, as, for example, the "A" or the "B" components used in polyurethane prepolymer techniques. Spraying techniques can also be used as, for example, are employed in "one-shot" procedures, the only requisite being that foaming be effected in a manner to allow the fibers to orient in the direction of the foaming.

Figure 1:
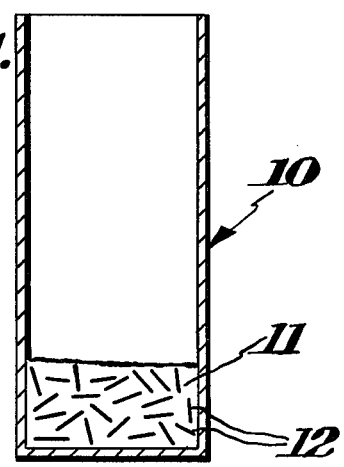
FIG. 1 is a cross-sectional view of a container containing an amount of an unfoamed mixture of this invention.
Figure 2:
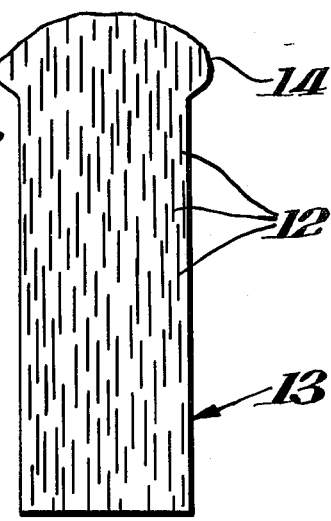
FIG. 2 is a cross-sectional view of the uncontained produce resulting from the foaming of the mixture in FIG. 1.
Figure 3:
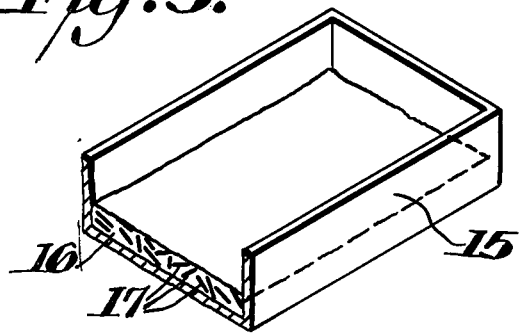
FIG. 3 is a perspective partially in cross-section of a long, horizontal container with some of said mixture.
Figure 4:
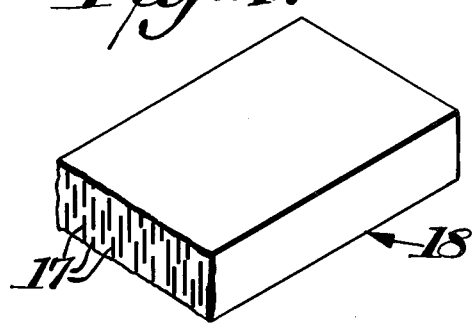
FIG. 4 shows in cross-section the foamed, uncontained product coming from FIG. 3.

As can be seen in FIG. 1, container 10 open at one end contains a liquid reactant mixture 11 in which fibers 12 are randomly contained. After foaming, fibers 12, as shown in FIG. 2, are parallely arranged and are aligned with the predominate upward axis of foaming. The polyurethane (shown removed from the container) in the typical mushroom cap 12 is generally used as scrap material. In FIG. 3, the container is a mold to be closed. It is shown with its longest dimension in a horizontal position, the liquid materials 11 and the fibers 12 being as in FIG. 1. After closing the mold and effecting foaming and removing the foam 14, the fibers are found to be parallelly aligned as to the width dimension of the pad (FIG. 4). Should the alignment be desired to be as to another dimension, say, the height, the container 15 is placed with its longest dimension in the vertical position (FIG. 5), and after foaming, the fibers are found to be in a parallelly arrangement height axis or dimension (FIG. 6).

Generally, it is preferred to use closed molds because of the restricted foaming and because such use affords the maximum compressive strength in the mold part, important for such uses as energy absorbing pads. Also, if increased tensile strengths and/or stiffness (modulus) are desired, as in the use of the product as panels, the closed mold arrangement in FIG. 5 is most beneficial. The charging of molds can be effected in any conventional manner, including injection molding techniques.

EXAMPLE III

To compare the primed fibers against the unprimed fibers referred to above, the following experiment is given using the same procedures and the polyurethane as given in Example I.

Table 3

| | Comprehensive Strengths - Unprimed Fibers | |
| --- | --- | --- |
| % Aluminum Fibers | Foam Tested Perpendicular to Foaming Direction (p.s.i.) | Foam Tested Parallel to Foam Expansion (p.s.i.) |
| 0.0 | 23.1* | 19.2 |
| 5.0 | 58.4 | 21.5 |

*Average of three runs tested in compression.

Thus, the increased compressive strength, due to the parallel alignment of the fibers, is 58.4/23.1 or 2.5/1.

From Table 1 above similar results are given in a control manner (fiber length, same density — 2.0 p.s.i., etc.) as to the above results in this example on unprimed but using fibers that were primed with an epoxy resin. As can be seen from Table 1 when using primed fibers the ratio is 74/25.5 or 2.9/1.

In similar experiments using a commercially available polysilicone, such as a methyl or a phenyl polysilicone, and using fiberglass fibers primed, as with an epoxy resin, to produce a non-rigid foam, parallel alignment is effected readily to produce increased compressive strengths due to said alignment.

The improvements described above are obtained with liquid materials that convert to foams, organic, inorganic or mixtures thereof, and the improvements are independent of the method of mixing in the fiber in the unfoamed liquids. Simple mixing means were used in Example I, for example, such as hand stirring or use of a motor-driven stirrer. In constrast, a conventional fiber chopper (motor-driven) can be used to inject the fibers into a moving stream or a stationary body of liquid that is to be foamed, provided that the injection occurs while the said liquid has not begun to polymerize or, more accurately, has not started to foam. Once the liquid is deposited in place with the fibers in it, foaming can start and improved strengths are attained due to the parallel alignment of the fibers.

While the invention has been disclosed herein in connection with certain embodiments and certain structural and procedural details, it is clear that changes, modifications or equivalents can be used by those skilled in the art; accordingly, such changes within the principles of the invention are intended to be included within the scope of the claims below.

What is claimed is:

1. A process for imparting anisotropy to foams which comprises mixing in liquid form the components of the foam which are to react during the foaming step to produce said foam by the action of a foaming agent to effect foam expansion, mixing therewith an amount of about 0.008% to about 10% by weight based on the weight of the foam to be produced of fibers having a length no greater than about 0.5 inch, and a length to diameter ratio not less than 4/1, and then effecting foaming, orienting said fibers by the action of the foaming agent whereby said fibers become substantially parallelly aligned to the direction of said foam expansion.

2. A process in accordance with claim 1 in which said fibers comprise inorganic materials.

3. A process in accordance with claim 1 in which said fibers comprise organic material.

4. A process in accordance with claim 1 in which said components are polyurethane foaming materials.

5. A process in accordance with claim 1 in which the density of said resultant fiber-loaded foam is about 2 lbs./cubic foot.

6. As a new article of manufacture, a foam of a polymeric material which foam has improved anisotropy and which foam contains therein about 0.008% to about 10% by weight of said foam of fibers having a length no greater than about 0.5 inch and a length to diameter ratio not less than about 4/1, said fibers being substantially parallelly aligned.

7. An article in accordance with claim 6 in which said fibers are inorganic.

8. An article in accordance with claim 6 in which said fibers are organic.

9. An article in accordance with claim 6 in which said foam is a polyurethane foam.

10. An article in accordance with claim 6 which has a density of about 2 lbs./cubic foot.

* * * * *

UNITED STATES PATENT OFFICE
CERTIFICATE OF CORRECTION

Patent No. 4,102,831          Dated July 25, 1978

Inventor(s) Alan A. Osgood

It is certified that error appears in the above-identified patent and that said Letters Patent are hereby corrected as shown below:

In the title:

"Anlsotropy" should read -- Anisotropy --.

Signed and Sealed this

Sixth Day of February 1979

[SEAL]

Attest:

RUTH C. MASON
Attesting Officer

DONALD W. BANNER
Commissioner of Patents and Trademarks